L. L. SUMMERS.
PROCESS FOR PRODUCING REACTIONS IN GASES AT HIGH TEMPERATURES AND APPARATUS FOR PRACTISING THE SAME.
APPLICATION FILED JULY 31, 1913.
1,291,660.     Patented Jan. 14, 1919.
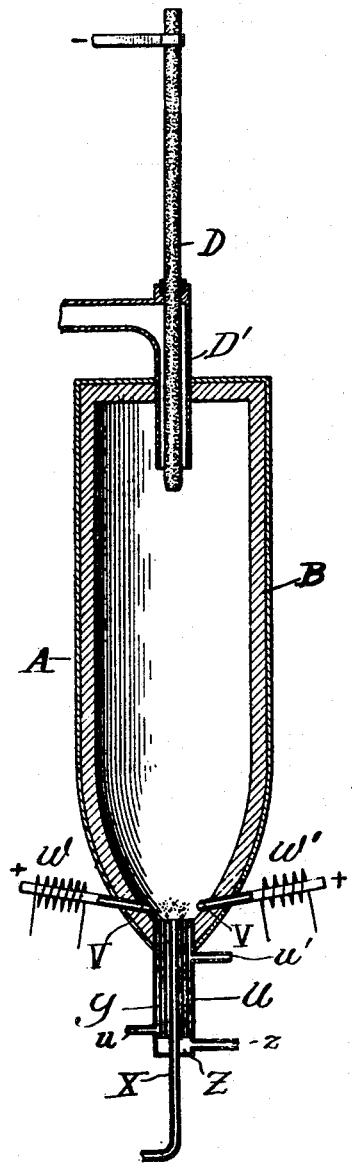

UNITED STATES PATENT OFFICE.

LELAND L. SUMMERS, OF CHICAGO, ILLINOIS.

PROCESS FOR PRODUCING REACTIONS IN GASES AT HIGH TEMPERATURES AND APPARATUS FOR PRACTISING THE SAME.

1,291,660.          Specification of Letters Patent.     Patented Jan. 14, 1919.

Application filed July 31, 1913. Serial No. 782,161.

*To all whom it may concern:*

Be it known that I, LELAND L. SUMMERS, a citizen of the United States, residing at Chicago, in the county of Cook and State of Illinois, have invented a new and useful Improvement in Processes for Producing Reactions in Gases at High Temperatures and Apparatus for Practising the Same, of which the following is a specification.

My invention relates more particularly to the synthesis of gaseous compounds requiring a very intense degree of heat and in the following specification is described more specifically with reference to compounds of nitrogen such as oxids ($NO$, $NO_2$, etc.) ammonia ($NH_3$) hydrocyanic acid ($HCN$) cyanid of ammonia ($NH_4CN$) etc., but the specific description is by way of exemplification only and both the process and apparatus are capable of use for the synthesis of other compounds and may be variously modified without departing from my invention. In the following claims, however, I have endeavored to define the scope of my invention as distinguished from the prior art so far as it is now known to me without, however, relinquishing or abandoning any part thereof.

The difficulty in effecting the synthesis of the gases with which my invention has to do arises, as it is generally agreed, from the fact that one of the gases, to wit, the nitrogen, is inert, or in other terms the molecular bonds between the atoms of the gas are strong and have to be weakened or destroyed before the gas will enter into combination with any other element. For this reason the electric arc has been long resorted to as a means for raising the temperature of the gases to the point at which the bonds are weakened or severed to permit new combinations to be formed. Unfortunately, however, the range of temperatures of synthesis of the gases substantially corresponds to that of the dissocation of the formed compounds so that in any process of this character the two reactions are taking place simultaneously and if the heat is maintained for a sufficient period equilibrium is established, that is to say, the reactions in the two directions become equal and the proportion of uncombined gases and compounds becomes substantially uniform, depending upon the temperature. If, however, the heating is discontinued and the gases permitted to cool, before they reach temperatures at which reaction ceases, they pass through certain intermediate temperatures at which equilibrium between the components and compounds involves a much smaller proportion of the compound than at the higher temperatures. It is, therefore, desirable to cool the gases resultant from the reaction as rapidly as possible through these intermediate temperatures in order to avoid reduction in the percentages of the compounds. Various processes and apparatus have therefore been devised for submitting gases which are to be combined to the high temperature of an electric arc and quickly withdrawing and cooling them, usually by contact with cooling walls. Such a process and apparatus are disclosed in my Patent No. 1,130,940, granted March 9, 1915.

In the improved process and apparatus which form the subject matter of the present application, the cooling action is magnified in intensity by converting the heat imparted to the gases by an electric arc into latent heat and more specifically into the latent heat of vaporization. In the practice of my process that one of the component reagents which is the more inert such as nitrogen, is introduced as heretofore into the heat of the electric arc and heated to the point where its bonds are sufficiently weakened to enable it to participate in the reaction. The more active reagent, however, is introduced in the liquid or even the solid form just at or as near as possible to the point of withdrawal of the product of the reaction from the furnace. The result is that the last mentioned reagent is immediately vaporized by the heat of the more inert gas, thus rapidly absorbing the heat therefrom in the form of latent heat of vaporization. The cooling is further intensified where found necessary by the injection of additional liquids which may or may not take part in the chemical reaction but which by its vaporization absorbs large quantities of heat very rapidly. In case the more active reagent is gaseous at ordinary temperatures, it may be liquefied or solidified prior to its introduction to the furnace.

In the accompanying drawing I have shown and in the following specification described a form of furnace adapted to the practice of my invention and I have also described in detail a specific example of the latter. It is to be understood, however, that the specific disclosure is for the purpose of exemplification only and that the scope of the invention is to be determined by the following claims in which I have attempted to distinguish it from the prior art so far as known to me without, however, relinquishing or abandoning any part thereof.

The drawing represents in longitudinal section a furnace for carrying out my invention. It comprises a metal shell A having a lining B of refractory material preferably converging to a point at one end. At this point is located the outlet member U having a central tube X connected with a source of water or other cooling medium by which a minute supply of water may be injected into the furnace, and a surrounding series of tubes Y connecting to a chamber Z and the outlet z. A water jacket surrounds these tubes and is provided with connections u, u' for the entrance and exhaust of water. The inner end of the water jacket is perforated whereby a spray of water is thrown into the lower end of the arc to cool the same. The furnace is further provided closely adjacent the outlet with a pair of electrodes V, V inserted through the wall of the furnace and connected together in multiple to a pole of an electric generator. The other pole of the generator is connected to an electrode which comprises a tube D' through which the more inert component enters the furnace, a movable carbon or similar electrode being provided to start the arc in the well-known manner. If desired, and as shown, the electrodes V, V, are tubular and may be used to supply a component gas or gases or liquids which do not require high heating in order to enter into the reaction. Each of the electrodes V, V is surrounded by an electric coil or solenoid w, w' which may be connected to the same or different electric generators and provided with any well-known or suitable means for passing an electric current through them alternately, the alternations occurring with great rapidity.

The operation of the furnace will be readily understood. After the arc has been started by the sliding of the electrode D it oscillates at the one end between the electrodes V, V as the current is rapidly switched from one to the other of the coils surrounding them. That one of the coils which receives the current repels the arc, this phenomena being well known to those skilled in this art and the arc is formed to the other electrode. When the current, however, is switched through the other coil the arc is again repelled to the remote electrode. The injection of the water or other cooling medium not only cools the heated gas but also materially assists in making the transfer of the arc instantaneous by quenching it at the electrode at which it is discontinued. The inert gas is very highly heated and then the products suddenly mixed with the active gas and cooled and then immediately withdrawn into the cooled outlet chamber having been reduced below the temperature at which they cease to dissociate. By reason of the sharp lowering of the temperature from that of the arc to a point below that of dissociation of the compound formed time is not given to permit the dissociation of the gases corresponding to the intermediate temperatures and consequently the resultant gases withdrawn from the furnace contain substantially the proportion of reactive gases and compounds corresponding to the highest temperatures which the gases have attained in the furnace. The water or other cooling agent being introduced in a very fine spray and small quantity at the outlet end of the furnace its effect is very much localized and it does not cool the arc or atmosphere within the furnace except immediately at the outlet. If a single component is to be introduced in liquid form it may be introduced at either one of the electrodes or through the inlet X, but if a number of active reagents are to be treated they may be introduced together or singly through the various supply passages adjacent the outlet. By the means described the entire contents of the furnace chamber may be cooled and withdrawn or any portion of them may be cooled and withdrawn and the arc again established, the injection of the cooling spray with its partial vaporization tending to induce an instant and more intense reduction of temperature at the time of the extinguishing of the arc than is ordinarily possible without the injection of the cooling spray. The injection of the liquefied reagent or of the inactive cooling liquid may be made intermittent and synchronized with the extinction or transfer of the arc.

Instead of transferring the arc from one electrode to the other obviously it may be made and broken by reciprocating the sliding electrode and if desired synchronizing with the movement thereof the introduction of the cooling liquid.

It will be understood also that if water is the fluid employed and the products of reaction be soluble, a large part of them may be collected by condensing the water from the exhaust gases of the furnace as for example in case nitric oxid is one of the products given off the nitric oxid combines with the water to form nitric acid.

In the manufacture of nitric acid the nitrogen is introduced through the tube D', after the formation of the arc and passes downwardly in the elongated furnace becoming more and more hightly heated but without opportunity to combine with other reagents until it reaches the neighorhood of the lower electrodes. The oxygen to be combined with the nitrogen may be introduced through either of the hollow electrodes or through the supply tube X, water being introduced at the same time in the form of a spray from the water jacket. If desired, the oxygen may be introduced in the form of a liquid. Water is simultaneously sprayed into the arc by the jacket as before described, the circulation in which is sufficient to prevent freezing of the water by the liquid oxygen, where the material is supplied in that form, introduced through the pipe X. Thus the products of the combination of nitrogen and oxygen and nitrogen, oxygen and water are immediately and sharply cooled and withdrawn through the outlet passages $y$, the chamber Z and the outlet $z$.

I claim:

1. A process for effecting the synthesis of materials in the electric arc furnace which consists in forming an arc in the furnace, passing a relatively inert gas through the arc until it is highly heated, injecting a substance to be combined with said gas in the form of a liquid into said arc, and also injecting a cooling liquid therewith, thereby extinguishing the arc and withdrawing the products of the reaction immediately after said injection to a cooler region.

2. A process of effecting reactions in an electric arc furnace which consists in forming an arc therein, passing the more inert of the reagents through the arc and injecting the more active reagent in the form of a liquid into the more inert of the reagents while in the arc and thereby extinguishing the arc.

3. A method for synthetizing which consists in highly heating a gas while isolated from the reagent to be combined therewith in an electric arc and injecting into the heated gas in the arc said reagent in the form of a liquid and thereby extinguishing the arc.

4. A process of synthetizing by means of an electric arc which consists in forming an arc passing a relatively inert gas therethrough and highly heating the same while isolated from the reagent to be combined therewith, injecting said reagent in the form of a liquid into the heated gas in the arc and immediately withdrawing the products of combination.

5. The process of synthetizing gases consisting in heating one or more of the same in an electric arc, intermingling the same, injecting a heat absorbing medium and causing one end of the arc to swing backward and forward through the heat absorbing medium.

6. The process of synthetizing gases consisting in heating the same in an electric arc, injecting a heat absorbent medium and causing one end of the arc to swing backward and forward through the heat absorbent medium.

7. An electric arc furnace for the synthesis of gases comprising a heating chamber, means for introducing the gases to be treated thereinto, an outlet member, means for spraying a cooling medium adjacent said outlet member, a pair of electrodes adjacent the outlet member, a third electrode and means for shifting the end of an arc from one of said pair of electrodes to the other.

LELAND L. SUMMERS.

Witnesses:
JOHN B. MACAULEY,
ROBERT DOBBERMAN.